(12) United States Patent
Oh

(10) Patent No.: US 7,856,231 B2
(45) Date of Patent: Dec. 21, 2010

(54) MOBILE COMMUNICATION TERMINAL HAVING A RADIO FREQUENCY CALIBRATION DATA RECOVERING FUNCTION AND A METHOD OF BACKING UP AND RESTORING CALIBRATION DATA

(75) Inventor: Hyung Suk Oh, Seoul (KR)

(73) Assignee: LG Electronics, Inc., Seoul (KR)

( * ) Notice: Subject to any disclaimer, the term of this patent is extended or adjusted under 35 U.S.C. 154(b) by 1094 days.

(21) Appl. No.: 11/552,121

(22) Filed: Oct. 23, 2006

(65) Prior Publication Data

US 2007/0093266 A1    Apr. 26, 2007

(30) Foreign Application Priority Data

Oct. 26, 2005    (KR)    ............... 10-2005-0101230

(51) Int. Cl.
*H04W 24/00* (2009.01)
*H04M 1/00* (2006.01)
*H04B 1/38* (2006.01)
*G06F 7/00* (2006.01)
*G06F 12/00* (2006.01)
*G06F 13/00* (2006.01)
*G06F 13/28* (2006.01)
*G06F 17/00* (2006.01)

(52) U.S. Cl. ............... 455/425; 455/558; 707/640; 711/162

(58) Field of Classification Search ............. 455/418, 455/419, 420, 423–425, 550.1, 558; 707/640; 711/162
See application file for complete search history.

(56) References Cited

U.S. PATENT DOCUMENTS

| 6,502,044 | B1 * | 12/2002 | Lane et al. | 702/63 |
| 6,651,188 | B2 * | 11/2003 | Harding et al. | 714/38 |
| 2005/0191998 | A1 * | 9/2005 | Onyon et al. | 455/419 |
| 2006/0020828 | A1 * | 1/2006 | Aihara et al. | 713/193 |
| 2006/0135126 | A1 * | 6/2006 | Lee et al. | 455/411 |
| 2006/0253668 | A1 * | 11/2006 | Borowski et al. | 711/162 |
| 2007/0178937 | A1 * | 8/2007 | Walters et al. | 455/558 |

* cited by examiner

*Primary Examiner*—George Eng
*Assistant Examiner*—Bryan Pitt
(74) *Attorney, Agent, or Firm*—Lee, Hong, Degerman, Kang & Waimey

(57) ABSTRACT

A mobile communication terminal, and a method of backing up and restoring calibration data thereof disclosed, thereby enabling a terminal to repair damage to radio frequency calibration data. The present invention includes a radio frequency calibration data checking unit comparing a checksum value of radio frequency calibration data stored in an internal terminal memory to a checksum of backup data value stored in a SIM card according when the terminal is turned on, the radio frequency calibration data checking unit determining whether the radio frequency calibration data stored in memory is the same as the data stored on the SIM radio frequency calibration data recovering unit for restoring the radio frequency calibration data from the SIM card.

2 Claims, 2 Drawing Sheets

MOBILE COMMUNICATION TERMINAL HAVING A RADIO FREQUENCY CALIBRATION DATA RECOVERING FUNCTION AND A METHOD OF BACKING UP AND RESTORING CALIBRATION DATA

CROSS-REFERENCE TO RELATED APPLICATIONS

This application claims the benefit of the Korean Patent Application No. 10-2005-0101230, filed on Oct. 26, 2005, which is hereby incorporated by reference as if fully set forth herein.

BACKGROUND OF THE INVENTION

1. Field of the Invention

The present invention relates to a mobile communication terminal ("terminal"), and more particularly, to a mobile communication terminal and a method of backing up and recovering calibration data. Although the present invention is suitable for a wide scope of applications, it is particularly suitable for facilitating the recovery of damaged frequency calibration data.

2. Discussion of the Related Art

Generally, radio frequency calibration data is stored in a flash memory within a GSM (global system for mobile communication) terminal, and, this data may be damaged or lost for some reason.

If radio frequency performance is degraded or GSM terminal requirements are not met, an auto-recovery function is not provided to the GSM terminal. However to repair the data, a user is required to visit a terminal manufacturer service center causing inconvenience.

SUMMARY OF THE INVENTION

Accordingly, the present invention is directed to a mobile communication terminal and a method of backing up and recovering calibration data that substantially obviate one or more problems due to limitations and disadvantages of the related art.

An object of the present invention is to provide a mobile communication terminal and a method of backing up and recovering calibration data which facilitates the repair of damaged radio frequency calibration data.

Another object of the present invention is to provide a mobile communication terminal and method of backing up and recovering calibration data by which degradation of radio frequency performance of a GSM terminal can be prevented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal according to the present invention includes a radio frequency calibration data checking unit for comparing a checksum value of radio frequency calibration data stored in an internal terminal memory to the checksum of backup data stored in a SIM (subscriber identification module) card when the terminal is turned and a radio frequency calibration data recovering unit for reading the backup data stored in the SIM card overwriting the backup data to the internal terminal memory when the checksums are different.

Preferably, the terminal further includes a radio frequency calibration data backup unit for generating radio frequency calibration backup data and storing the generated radio frequency calibration backup data in the SIM card.

More preferably, the radio frequency calibration backup data includes calibration data stored in the internal terminal memory, an international mobile station equipment identity (IMEI) given to each terminal, and a checksum value for the radio frequency calibration data.

In another aspect of the present invention, a method of backing up radio frequency calibration data of a terminal includes receiving data calculated according to an execution result of radio frequency calibration data stored in an internal terminal memory, generating backup data by adding an IMEI given to each terminal and a checksum value for the radio frequency calibration data to the received data, and storing the generated backup data in a SIM card.

In another aspect of the present invention, a method of backing up radio frequency calibration data of a terminal includes checking whether radio frequency calibration backup data matching an IMEI of the terminal exists in a SIM card when power is applied to the terminal, if the backup data exists, comparing a checksum value of the calibration data stored in an internal terminal memory to a checksum value stored in the SIM card, and if the two checksum values differ from each other, overwriting the backup data stored in the SIM card to the internal terminal memory, and if the backup data is not stored on the SIM card, generate backup data by adding an IMEI and the checksum value of the calibration data stored in the internal memory to the calibration data, and store the generated backup data to the SIM card.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
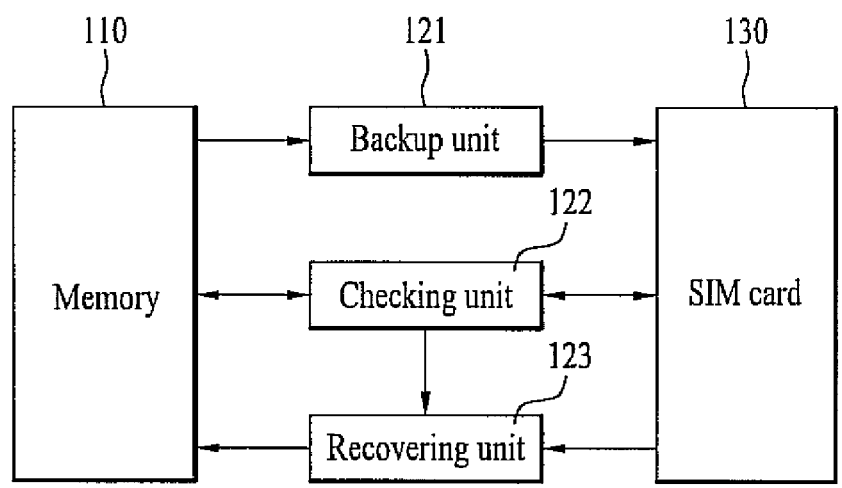
FIG. 1 is a block diagram of a mobile communication terminal having a function for backing up and recovering radio frequency calibration data according to an embodiment of the present invention.

FIG. 1 is a schematic block diagram of a terminal having a function of backing up and recovering radio frequency calibration data according to an embodiment of the present invention.

Referring to FIG. 1, a terminal according to an embodiment of the present invention includes a radio frequency calibration data backup unit 121 for generating radio frequency calibration data and for storing the generated radio frequency calibration data in a SIM card 130, a radio frequency calibration data checking unit 122 for comparing a checksum values of the radio frequency calibration data stored in an internal terminal memory 110 and the backup data stored on the SIM card 130 when the terminal is turned on and determining whether the checksums differ, and a radio frequency calibration data recovering unit 123 reading the backup data stored in the SIM card 130 and rewriting the radio frequency calibration data to the internal terminal memory 110 if the checksum of the data stored in the internal memory is not the same as to the checksum of the backup data stored on the SIM card.

Figure 2:
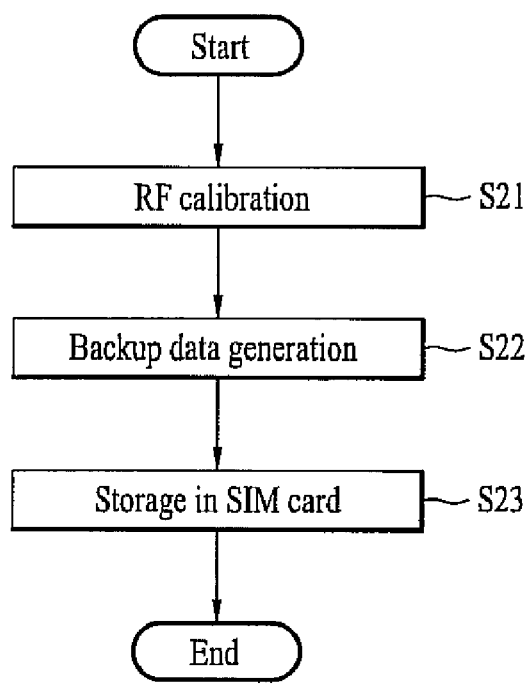
FIG. 2 is a flowchart of a method for backing up radio frequency calibration data of a mobile communication terminal according to an embodiment of the present invention.
Figure 3:
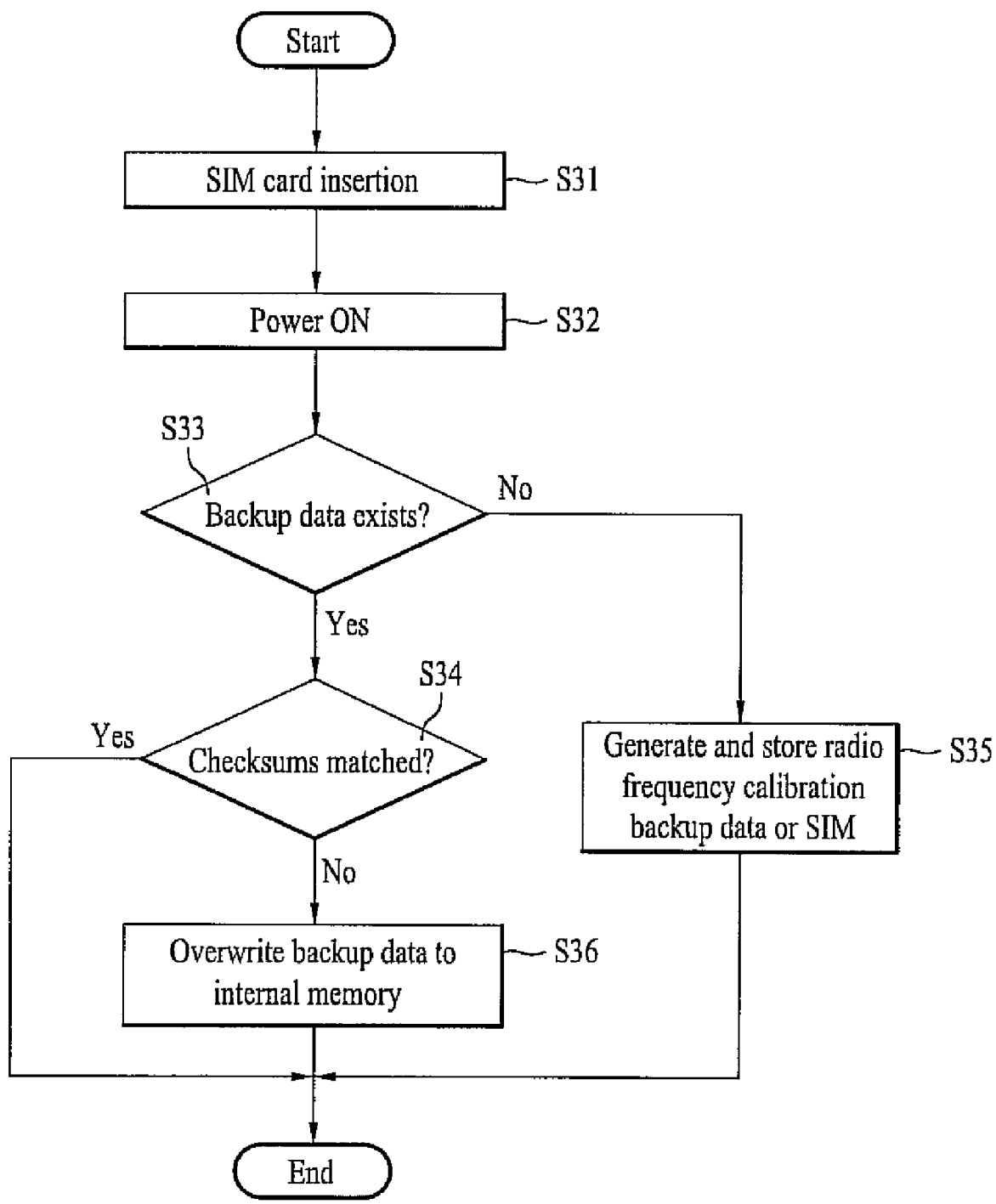
FIG. 3 is a flowchart of a method for recovering radio frequency calibration data of a mobile communication terminal according to an embodiment of the present invention.

FIG. 2 is a flowchart of a method of backing up radio frequency calibration data of a mobile communication terminal according to an embodiment of the present invention, and FIG. 3 is a flowchart of a method of recovering radio frequency calibration data of a mobile communication terminal according to an embodiment of the present invention.

Referring to FIG. 2 and FIG. 3, a backup process is explained as follows. First of all, data calculated as a result of performing radio frequency calibration for performance enhancement of a terminal is stored in the internal terminal memory 110 (S21).

By adding an IMEI value given to each terminal and a checksum value for radio frequency calibration data to the radio frequency calibration data stored in the memory 110, backup data is generated (S22). The backup unit 121 stores the backup data in the SIM card 130.

Thus, if the backup data is stored in the SIM card 130, a user is able to avoid visiting a service center to repair radio frequency performance degradation because a recovery operation is automatically carried out within the terminal.

Referring now to FIG. 3, an auto-recovery process is explained as follows. First of all, an SIM card is inserted in a terminal body to use a terminal (S31) and power is supplied to the terminal when the terminal is turned on (S32).

The check unit 122 checks whether radio frequency calibration backup data matching a terminal IMEI value exists in the SIM card 130 (S33). If the backup data does not exist in the SIM card 130, the backup procedure for storing radio frequency calibration data in the SIM card 130 is executed (S35).

If the backup data exists in the SIM card 130, it is checked to determine whether the checksum value stored in the internal terminal memory matches the checksum value stored in the SIM card 130 (S34).

If the checksums are different from each other, the radio frequency calibration data stored in the SIM card 130 is rewritten to the internal terminal memory (S36). If the checksum values match, a normal booting process proceeds.

Accordingly, the present invention provides for automatically backing up radio frequency calibration data and restoring radio frequency calibration data, thereby enabling the user to avoid the inconvenience of visiting a manufacturer's service center for repair.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
   a radio frequency calibration data backup unit for generating radio frequency calibration backup data and storing the generated radio frequency calibration backup data in a subscriber identification module (SIM) card;
   a radio frequency calibration data checking unit for, upon power on of the mobile communication terminal, determining whether an international mobile station equipment identity (IMEI) included in the radio frequency calibration backup data stored in the SIM card and an IMEI of the mobile communication terminal match each other and, if it is determined that the IMEI stored in the SIM card and the IMEI of the mobile communication terminal match each other, comparing a first checksum value stored with radio frequency calibration data in an internal memory to a second checksum value included in the radio frequency calibration backup data stored in the SIM card; and
   a radio frequency calibration data recovering unit for reading the radio frequency calibration backup data stored in the SIM card and rewriting the radio frequency calibration data stored in the internal memory using the read radio frequency calibration backup data if the first checksum value and the second checksum value are determined to be different from each other,
   wherein the radio frequency calibration backup data unit is for re-generating the radio frequency calibration backup data and storing the re-generated radio frequency calibration backup data in the SIM card if it is determined that the IMEI stored in the SIM card and the IMEI of the mobile communication terminal do not match each other, and
   wherein the mobile communication terminal is configured to execute a normal booting process if the first checksum value and the second checksum value are determined to be equal to each other.

2. A method of backing up radio frequency calibration data of a mobile communication terminal, the method comprising:
   generating radio frequency calibration backup data;
   storing the generated radio frequency calibration backup data in a subscriber identification module (SIM) card;
   determining, by the mobile communication terminal upon power on of the mobile communication terminal, whether an international mobile station equipment identity (IMEI) included in the radio frequency calibration backup data in a stored in the SIM card and an IMEI of the mobile communication terminal match each other;
   if it is determined that the IMEI stored in the SIM card and the IMEI of the mobile communication terminal match each other, comparing, by the mobile communication terminal, a first checksum value stored with radio frequency calibration data in an internal memory to a second checksum value included in the radio frequency calibration backup data stored in the SIM card;

if the first checksum value and the second checksum value are determined to be different from each other, rewriting, by the mobile communication terminal, the radio frequency calibration data stored in the internal memory using the radio frequency calibration backup data;

re-generating the radio frequency calibration backup data and storing the re-generated radio frequency calibration backup data in the SIM card if it is determined that the IMEI stored in the SIM card and the IMEI of the mobile communication terminal do not match each other; and if the first checksum value and the second checksum value are determined to be equal to each other, executing a normal booting process.

\* \* \* \* \*